United States Patent
Schaad

(10) Patent No.: US 7,044,531 B2
(45) Date of Patent: May 16, 2006

(54) COVER FOR AUTOMOBILE VISOR

(76) Inventor: Nicole Schaad, 16 Berwick St., Akron, OH (US) 44312

( * ) Notice: Subject to any disclaimer, the term of this patent is extended or adjusted under 35 U.S.C. 154(b) by 0 days.

(21) Appl. No.: 11/009,188

(22) Filed: Dec. 10, 2004

(65) Prior Publication Data

US 2005/0093329 A1     May 5, 2005

Related U.S. Application Data

(63) Continuation-in-part of application No. 10/440,623, filed on May 19, 2003, now abandoned.

(51) Int. Cl.
*B60J 3/00*      (2006.01)
(52) U.S. Cl. ........................... 296/97.5; 296/1.08
(58) Field of Classification Search ............... 296/97.1, 296/97.5, 97.6, 1.07, 1.08, 1.11; 160/DIG. 3
See application file for complete search history.

(56) References Cited

U.S. PATENT DOCUMENTS

| | | | | |
|---|---|---|---|---|
| 2,839,860 A | * | 6/1958 | Fry | 296/97.5 |
| 3,026,999 A | * | 3/1962 | Constantino | 296/97.5 |
| 3,809,428 A | * | 5/1974 | Cohen | 296/97.5 |
| 4,781,409 A | * | 11/1988 | Harbison | 296/97.6 |
| 4,944,971 A | * | 7/1990 | McLaughlin | 296/97.1 |
| 5,195,668 A | * | 3/1993 | Kunes et al. | 296/97.5 |
| 5,651,577 A | * | 7/1997 | Lacy et al. | 296/97.6 |
| 5,653,364 A | * | 8/1997 | Eskandry | 296/97.5 |
| 5,882,059 A | * | 3/1999 | Romero | 296/97.6 |
| 5,947,545 A | * | 9/1999 | Akagi et al. | 296/97.5 |
| 6,176,539 B1 | * | 1/2001 | Westerman | 296/97.6 |
| 6,231,108 B1 | * | 5/2001 | Nicol | 296/97.6 |
| 6,594,865 B1 | * | 7/2003 | O'Mahony | 296/97.6 |
| 6,659,529 B1 | * | 12/2003 | Palmer et al. | 296/97.6 |
| 2001/0035663 A1 | * | 11/2001 | Garcia et al. | 296/97.6 |
| 2005/0046223 A1 | * | 3/2005 | Virts et al. | 296/97.6 |

* cited by examiner

*Primary Examiner*—Jason Morrow
(74) *Attorney, Agent, or Firm*—John D. Gugliotta; Olen L. York, III

(57) ABSTRACT

A cover for an automobile sun visor comprises a front panel, a rear panel, a top margin or a lower margin, at least one aperture, and a seam. The cover is slidably placed onto a visor, and covers warning labels, protects the fabric from dust, dirt and other marring materials, and provides indicia about at least one panel of the cover.

15 Claims, 10 Drawing Sheets

COVER FOR AUTOMOBILE VISOR

RELATED APPLICATIONS AND DISCLOSURES

This application is a continuation-in-part of prior U.S. application Ser. No. 10/440,623, now abandoned filed on May 19, 2003, incorporated by reference as if fully rewritten herein.

BACKGROUND OF THE INVENTION

1. Field of the Invention

The present invention relates generally to a cover for an automobile visor, and, more particularly, to a cover for an automobile visor that is easily placed on an automobile visor and includes identifying indicia, such as a logo.

2. Description of the Related Art

Automobile enthusiasts comprise a significant portion of the consuming public, and often search for particularized accessories to uniquely express a sentiment, an attitude or to display allegiance to particular brands and products. The spectrum of accessories available for purchase is wide, and includes the addition of variously placed lights, and of a plurality of colors, mud flaps, customized front grills and tailgates, spoilers, chrome engine and wheel components, among others it is envisioned that the present invention fulfills a need for visor covers that convey the same unique sentiments and messages that the aforementioned automobile accessories provide.

Consequently, a need has been felt for providing an apparatus which overcomes the problems inherent in the prior art. As such, the present invention provides an apparatus for inexpensively providing a cover for an automobile sun visor with identifying indicia that is easily installed, easily removed for washing or discarding, and stylish for self-expression.

SUMMARY OF THE INVENTION

In one exemplary embodiment, the present invention discloses and aesthetic enhancement for an automobile sun visor having a returnably resilient fabric cover for enveloping the sun visor of an automobile, the cover further having indicia affixed to a front surface of the cover such that when the sun visor is positioned for obstructing the sun, the indicia is visible to those outside the automobile, the cover having a width sufficient to obstruct a warning label affixed on the sun visor, and the cover having a removable mirror on a rear surface of the cover.

In another exemplary embodiment, the present invention discloses an aspect of the invention describing a cover for an automobile sun visor having a front panel and a rear panel coupled at a top margin or a lower margin by a seam, the front panel and rear panel each having a lateral width not greater than the lateral width of a sun visor on which the cover is placed, the front panel and the rear panel manufactured from a returnably resilient material; indicia affixed to the cover along the front panel so that when the sun visor is positioned for obstructing the sun, the indicia is prominently visible to those outside the automobile; at least one aperture formed by coupling of the front panel and the rear panel about the seam; the lateral width of the panels are of a width sufficient to obstruct warning labels affixed or imprinted on the sun visor such that a user can slidably insert the sun visor through the aperture; and a mirror provided on the rear panel.

In another exemplary embodiment, the present invention discloses an aspect of the invention describing a cover for an automobile sun visor comprising a front panel and a rear panel coupled at a top margin or a lower margin by a seam, the front and rear panel having a lateral width not greater than the lateral width of a sun visor on which the cover is placed, the front panel and the rear panel manufactured from a returnably resilient material; indicia affixed to the cover along the front panel so that when the sun visor is positioned for obstructing the sun, the indicia is prominently visible to those outside the automobile; at least one aperture formed by coupling of the front panel and the rear panel about the seam, the sun visor inserted into the at least one aperture; a first opening formed along the top margin through which a stem of the sun visor may project; and a second opening formed along the top margin through which a post of the sun visor may project, the second opening formed by selective coupling of a segment of the front panel and a segment of the rear panel by a releasable closure.

It is therefore an object of the present invention to provide a cover for an automobile sun visor.

It is another object of the present invention to provide a cover that is manufactured from a durable fabric, wherein the fabric may be of a resiliently returnable type or material for snugly fitting about the visor.

It is another object of the present invention to provide a cover that includes at least one aperture for placing the cover on a visor in a slidable manner.

It is another object of the present invention to provide a cover that includes two apertures for slidably placing the cover on a visor.

It is another object of the present invention to provide a cover that includes identifying indicia intended to convey a message, a sentiment or express allegiance to a brand name and/or product.

Briefly described according to one embodiment of the present invention a a cover for an automobile sun visor comprises a front panel, a rear panel, a top margin or a lower margin, at least one aperture, and a seam. The cover is slidably placed onto a visor, and covers warning labels, protects the fabric from dust, dirt and other marring materials, and provides indicia about at least one panel of the cover.

It is an advantage of the present invention to provide an automobile accessory at an inexpensive cost to the manufacturer and consumer.

It is an additional advantage of the present invention to provide an automobile accessory that is available in a variety of colors and with a variety of identifying indicia.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 11, wherein illumination means comprises a 12 volt adapter plug electrically and operatively connected to the light panel, the plug providing electricity through the electrical wire and to the light panel, thereby illuminating the indicia provided on the cover;

FIG. 13 is a perspective view of an alternate embodiment, wherein the cover has a first opening and a second opening formed along the top margin corresponding to the stem and the post of the sun visor, the openings allowing the stem and post to project through;

DESCRIPTION OF THE PREFERRED EMBODIMENTS

Figure 1:
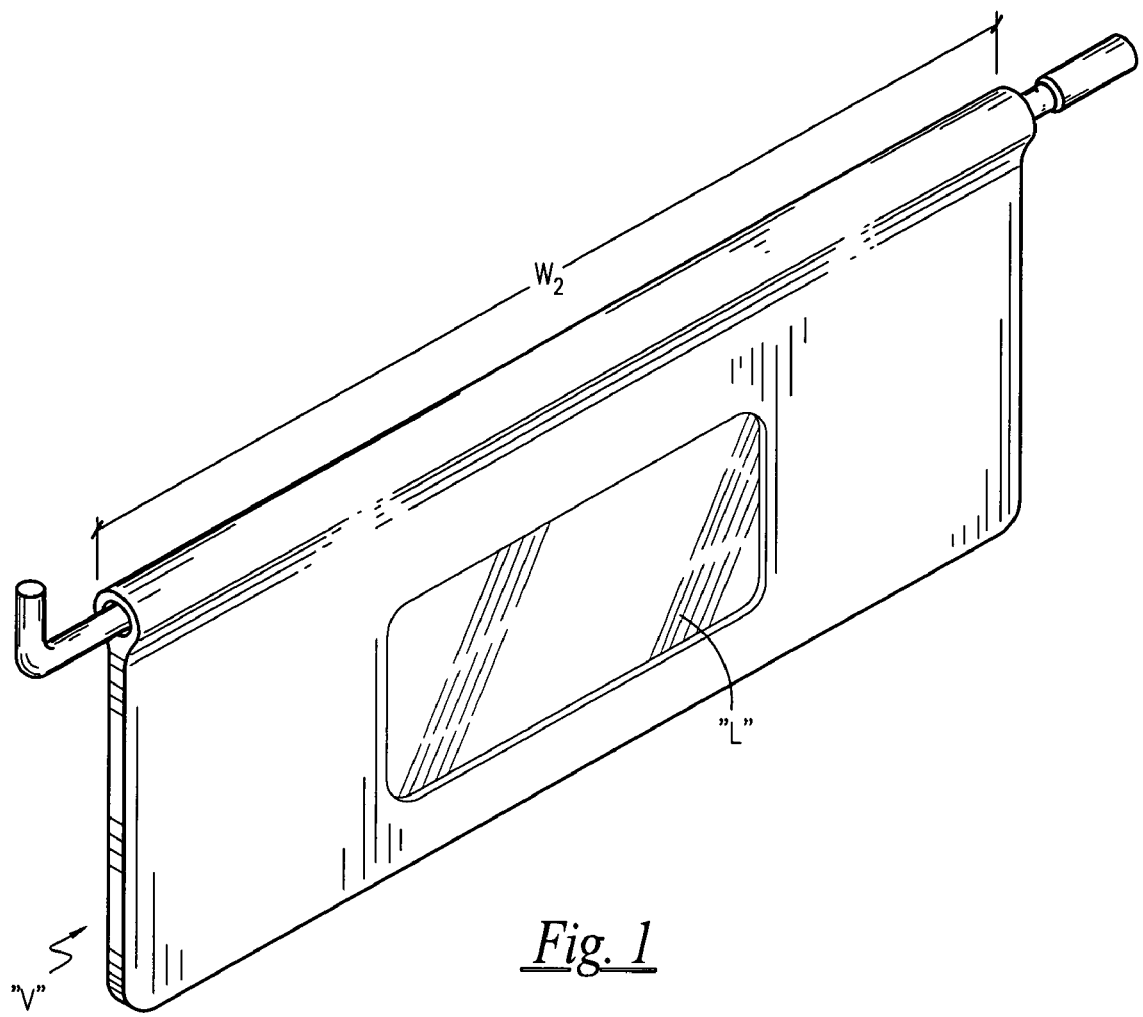
FIG. 1 is a perspective view of a sun visor "V" with a generic warning label "L" and a lateral width "$w_2$" of the visor.
Figure 2:
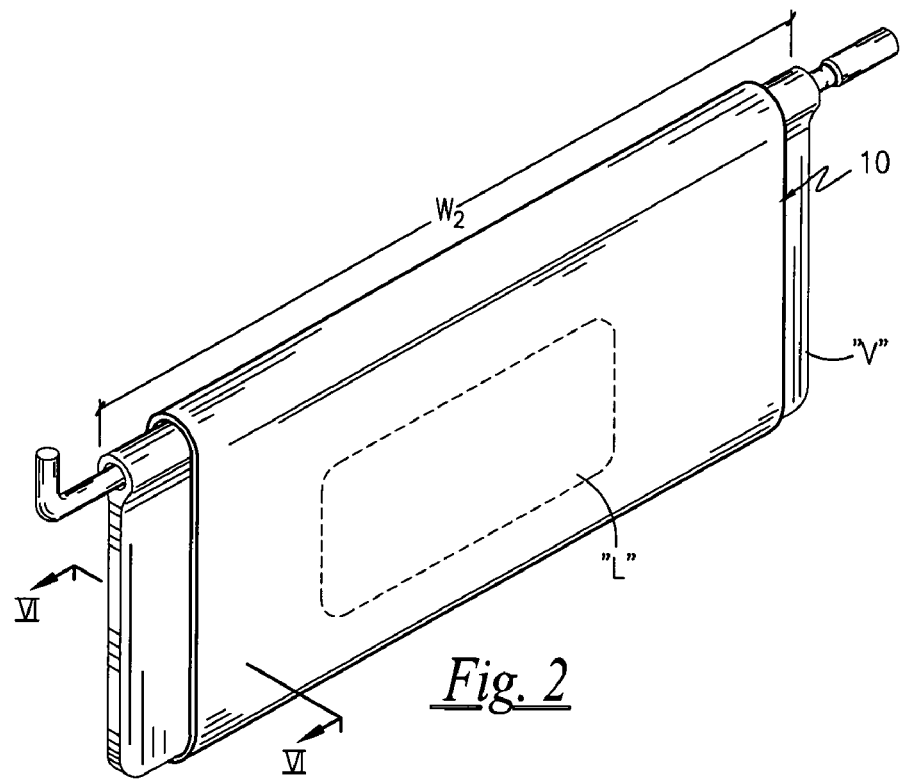
FIG. 2 is a perspective view of a cover placed onto a visor.
Figure 3:
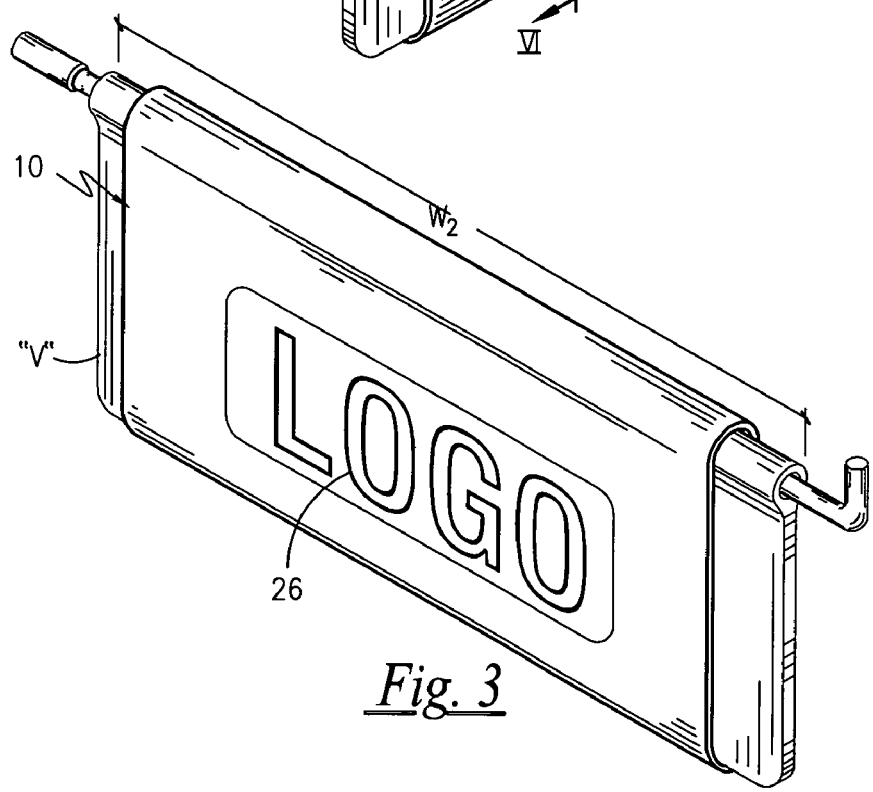
FIG. 3 is a perspective view of the cover placed onto a visor with an indicia placed therein, labeled as "LOGO"
Figure 4:
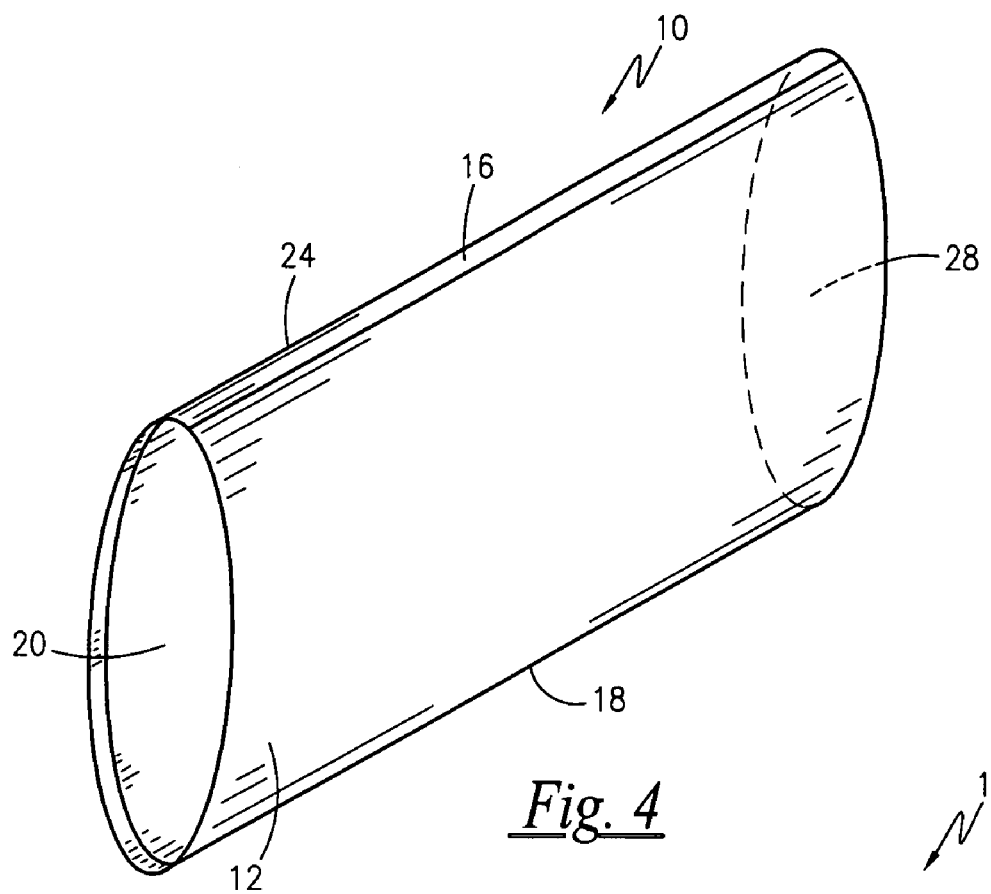
FIG. 4 is a perspective view of the cover with two apertures.

The best mode for carrying out the invention is presented in terms of its preferred embodiment, herein described below and where appropriate depicted within the FIGS. 1 through 16.

1. Detailed Description of the Figures

Referring now to FIG. 1 through FIG. 6, a cover or aesthetic enhancement for an automobile sun visor 10 is shown in accordance with a preferred embodiment of the present invention. The cover 10 comprises a front panel 12, a rear panel 14, a top margin 16, a lower margin 18, at least one aperture 20 (a first aperture 20), and a seam 24. The lateral width "$w_1$" of the front and rear panels 12 and 14 and top and lower margins 16 and 18 is not greater than the lateral width "$w_2$" of the sun visor "V" on which the cover 10 is placed, although the lateral width may be substantially the same as the lateral width of the sun visor, so that a snug fit is provided by the cover onto the visor. Conversely, the lateral width "$w_1$" is envisioned to be of a width sufficient to obstruct the warning labels "L" commonly affixed or imprinted on the sun visor "V".

Figure 5:
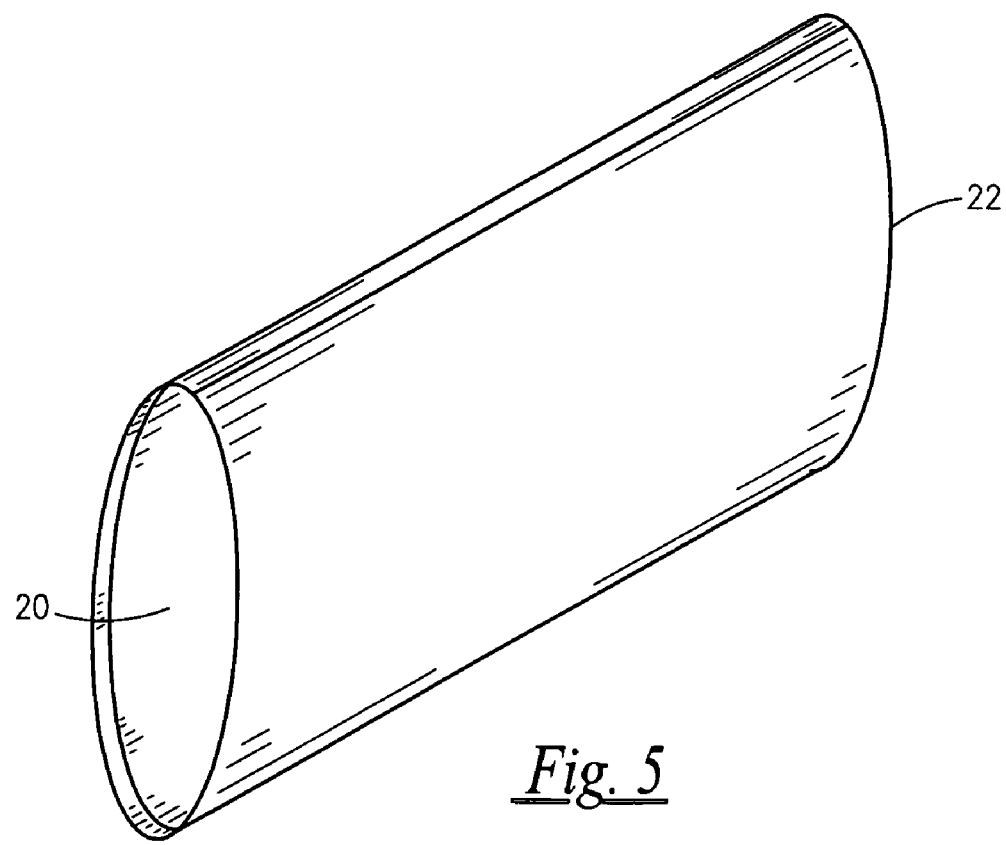
FIG. 5 is a perspective view of the cover with one aperture.
Figure 6:
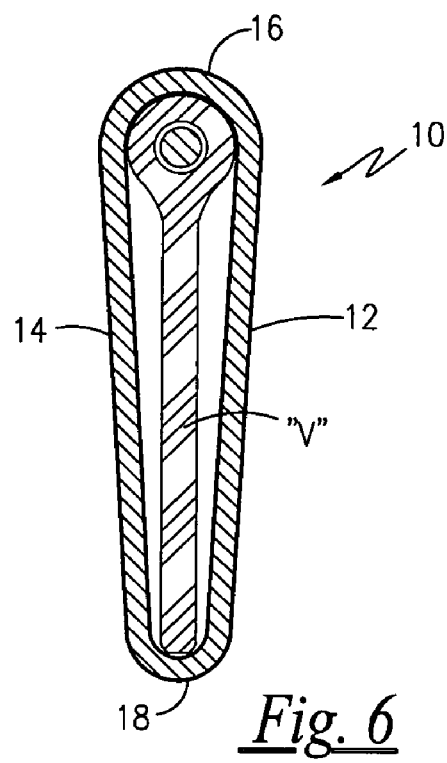
FIG. 6 is a sectional view of the cover and visor, taken along the line VI—VI as shown in FIG. 2.

The first aperture 20 is formed by connection of the cover 10 about seam 24. The first aperture 20 is opposite to a margin 22 (as seen in FIG. 5, which may be further identified as a vertical margin, indicating direction of the margin, or a lateral margin, indicating the position of the margin relative to the other elements of the cover 10). A user slidably inserts a sun visor "V" through the aperture 20 until the first end of the sun visor "V" that was inserted abuts the margin 22. An opening (not shown) may be formed in the margin 22 to permit the stem of the visor "V" to protrude through and permit the forcible removal or impingement in the housing in the roof of the vehicle. In an other envisioned embodiment the first aperture 20 is formed at a side opposite to the second aperture 28. The first and second apertures 20 and 28 permit a user to slidably arrange the cover 10 on a sun visor "V", wherein the sun visor "V" slidably passes through one aperture 20 or 28 and then the remaining aperture 20 or 28 so as to envelop the sun visor "V". The seam 24 may be position in a plurality of locations along the cover 10, although it is envisioned that the seam 24 is positioned along the top or lower margin 16 and 18 so as to be mostly hidden from view. The connection about seam 24 is envisioned to be either permanent or semi-permanent. Permanent connection may be accomplished through fabric stitching, bonding adhesives or other similar means. Semi-permanent connection may be accomplished with hook and loop fasteners like VELCRO®, button snaps, buttons, zippers or a variety of other similar means generally used for the connection of two members.

Identifying indicia 26 may be permanently or semi-permanently affixed, in the same or similar manners described in securing the seam 24, to the cover 10 along the front panel 12, the rear panel 14 or each panel 12 and 14 simultaneously. In one embodiment of the present invention, the cover 10 contains one indicia 26 along either the front or rear panel 12 or 14. Once the cover 10 is placed onto the sun visor "V", it is envisioned that the cover 10 is positioned so that the indicia 26 will face outward from the automobile, so that when the sun visor "V" is positioned for obstructing the sun, the indicia 26 is prominently seen by those outside the automobile. The indicia 26 is intended to provide means for personal expression, and includes words, phrases, symbols and logos. It is envisioned that automobile enthusiasts, especially enthusiasts that indulge in accessorizing, will desire cover(s) 10 that include automobile related indicia 26, including words, phrases, symbols and/or logos specific to the make and/or model of automobile that the enthusiast possesses. For example, and not by way of limitation to the scope of the invention of claims, an automobile enthusiast that possesses JEEP® vehicles and accessories may be interested in obtaining cover(s) 10 that house at least one indicia of JEEP®, DAIMLER®, CHRYSLER® or the pentagon-shaped symbol that represents the Daimler-Chrysler Corporation, or any of the other numerous symbols and marks possessed by the Daimler-Chrysler Corporation that are identifiable with the Jeep-brand product. Obviously, any automaker or any brand of product is easily substituted for the example provided.

The cover 10 is envisioned as being manufactured from a variety of fabrics that are capable of resilient return, such as spandex-type materials like LYCRA®, or more familiar fabrics such as cotton, polyester and rayon, among many others. It is envisioned that the cover 10 is removable and replaceable with another cover 10 of the user's choosing, and when the original cover 10 is again placed over the visor "V", the cover 10 maintains a firm disposition about the visor "V", but retaining the freedom to laterally slide along the lateral width "$w_2$" or sliding longitudinally about the visor "V". It is further envisioned that the cover 10 is removable from the visor "V" and washable with clothing laundry.

Figure 7:
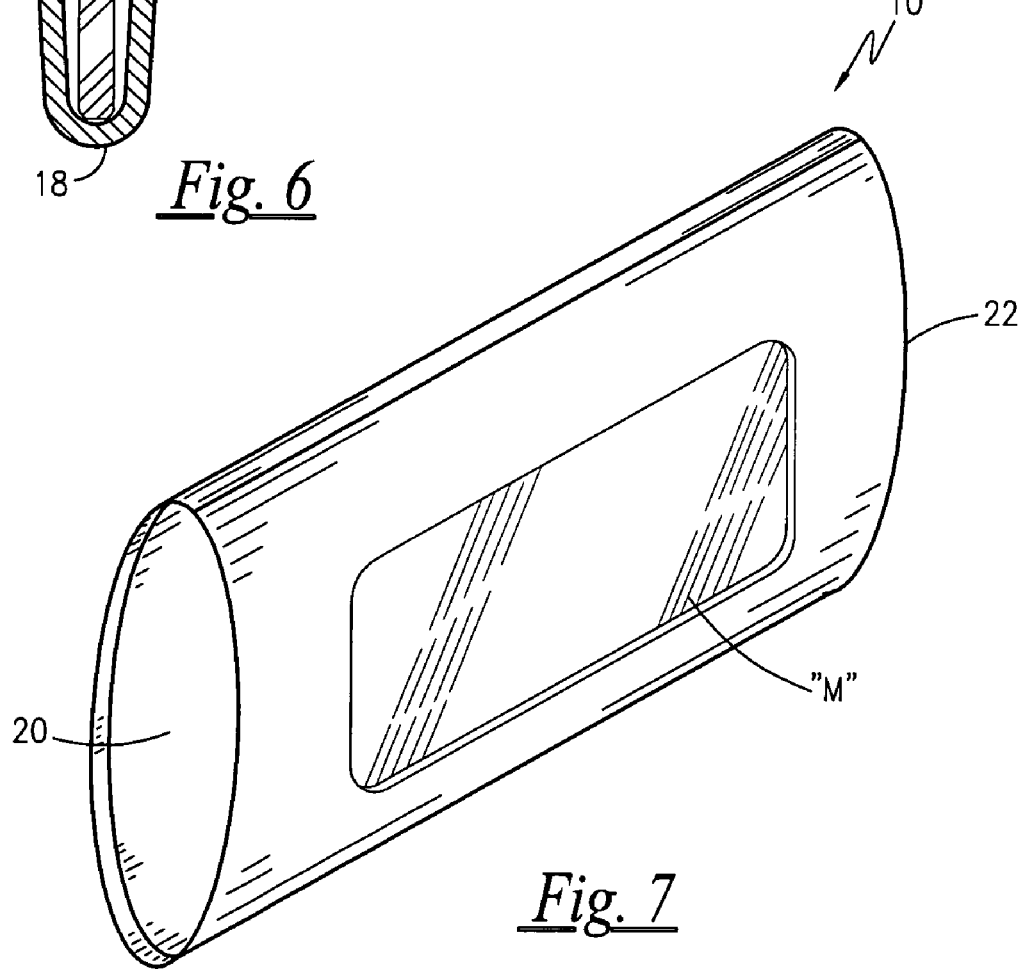
FIG. 7 is a perspective view of the cover with an insertable or integral mirror provided.

Referring now to FIG. 7, an alternative embodiment of the cover 10 is depicted. For visors "V" that are not equipped with mirrors, the cover 10 may include an insertable or integral mirror "M" on the cover 10 along the front panel 12 or the rear panel 14, depending upon the presence of indicia 26 or other accessory features that might be included with the cover 10. It is envisioned that the mirror "M" will face a user within the vehicle so that when the visor "V" is pivoted downward, the mirror "M" is exposed for use.

Figure 8:
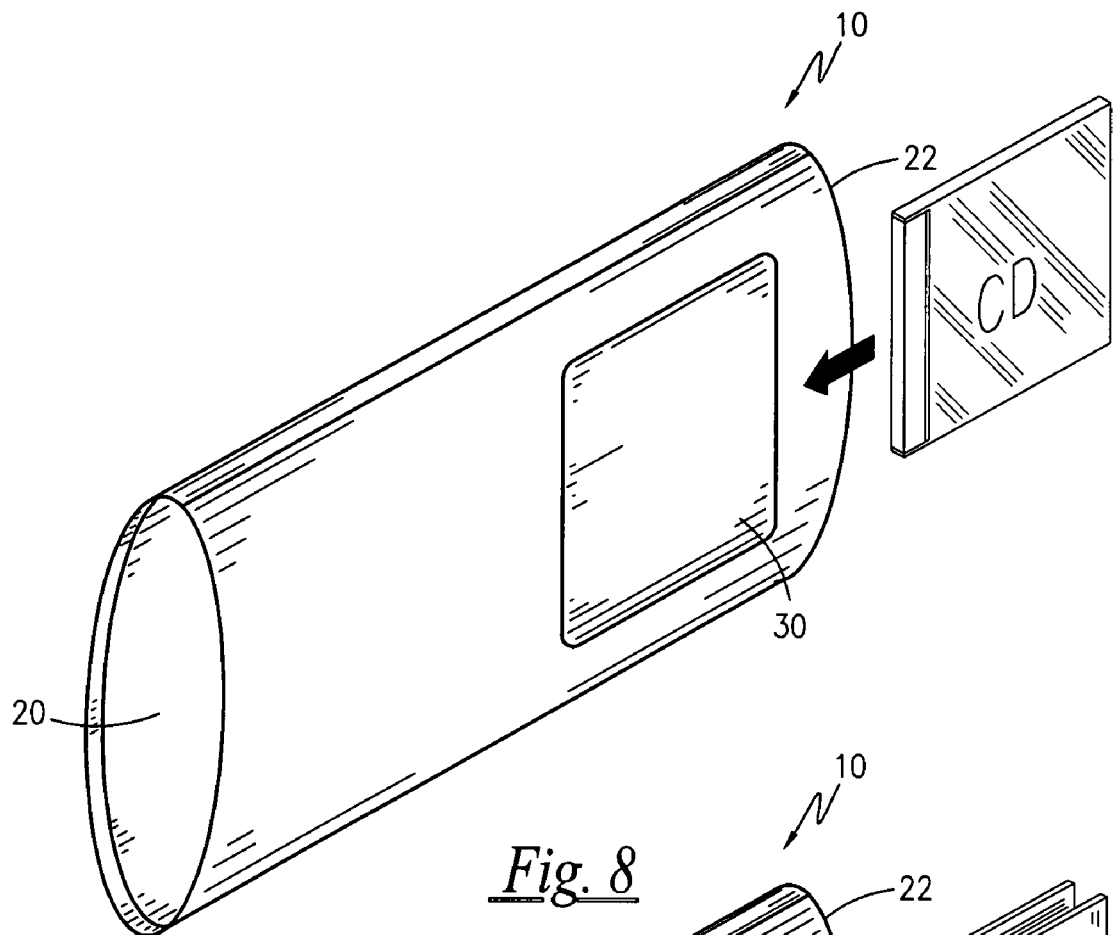
FIG. 8 is a perspective view of the cover with a pocket provided.

Referring now to FIG. 8, an alternative embodiment is depicted. The cover 10 includes an integral pocket 30 for storage of a variety of items or objects, including wallets, loose paper, pens/pencils, identification, garage door openers and/or other similar items. It is envisioned that the pocket 30 may be sized to accommodate the storage of compact discs (CDs) as an alternative to the CD storage devices that may be affixed to visors "V". It is further envisioned that a plurality of pockets 30 may be provided along the lateral width of the cover 10 to accommodate maximum storage of loose items as described above.

Figure 9:
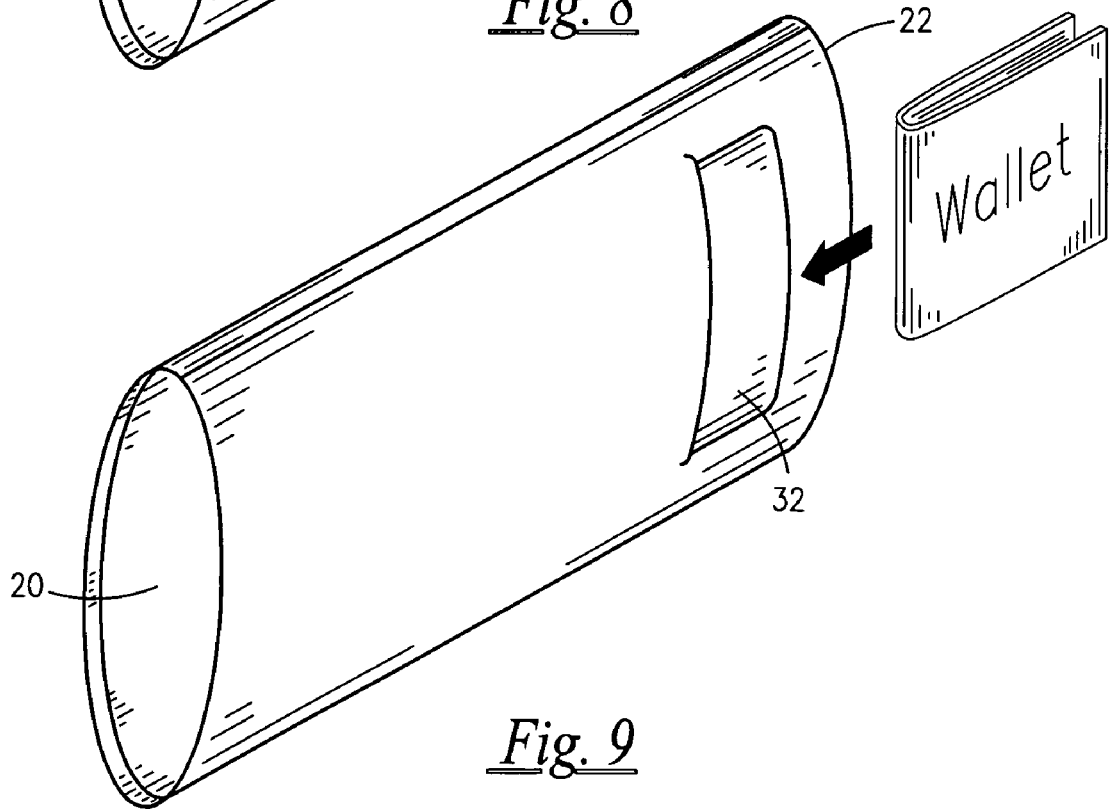
FIG. 9 is a perspective view of the cover with a retention strap provided.

Referring now to FIG. 9, an alternative embodiment is depicted, wherein the cover 10 includes a retention strap 32 for storage of some items previously described. The retention strap 32 is envisioned has being bound to the cover 10 at opposite ends and comprising a flexible and returnably resilient material so as to snugly impinge items within the strap 32. A wallet is shown as being inserted into the strap 32 in FIG. 9. It is further envisioned that a plurality of straps 32 may be provided along the lateral width of the cover 10 for storage of multiple items.

It is envisioned that a combination of the features disclosed, including the mirror "M", the pocket(s) 30 and the strap(s) 32, may be provided in various embodiments of the presently disclosed invention. The addition of one or all of the features mirror "M", the pocket(s) 30 and the strap(s) 32 permit maximum versatility and utility of the cover 10.

The cover(s) 10 is/are envisioned to provide obstruction to the warning labels "L" that are imprinted or affixed to sun visors "V" that many, if not most, people are familiarized with immediately upon purchase of the automobile. Many people consider the labels "L" unsightly or aesthetically displeasing, thus the cover(s) 10 provides a mechanism for simultaneously covering the labels "L" and also a mechanism for self-expression through the affixed indicia 26. Furthermore, the cover(s) 10, also provide a mechanism for prevention of dust buildup on the visor(s) "V", thereby preserving the aesthetics of the visor(s) "V" and adding value (or at least curbing depreciation) of the automobile interior. The cover(s) 10 also provide a mechanism for the prevention of staining or the imparting of dirt, grease, oil or other fabric damaging material to the visor(s) "V" from the repetitive adjustments that a user engages during automobile use.

Figure 10:
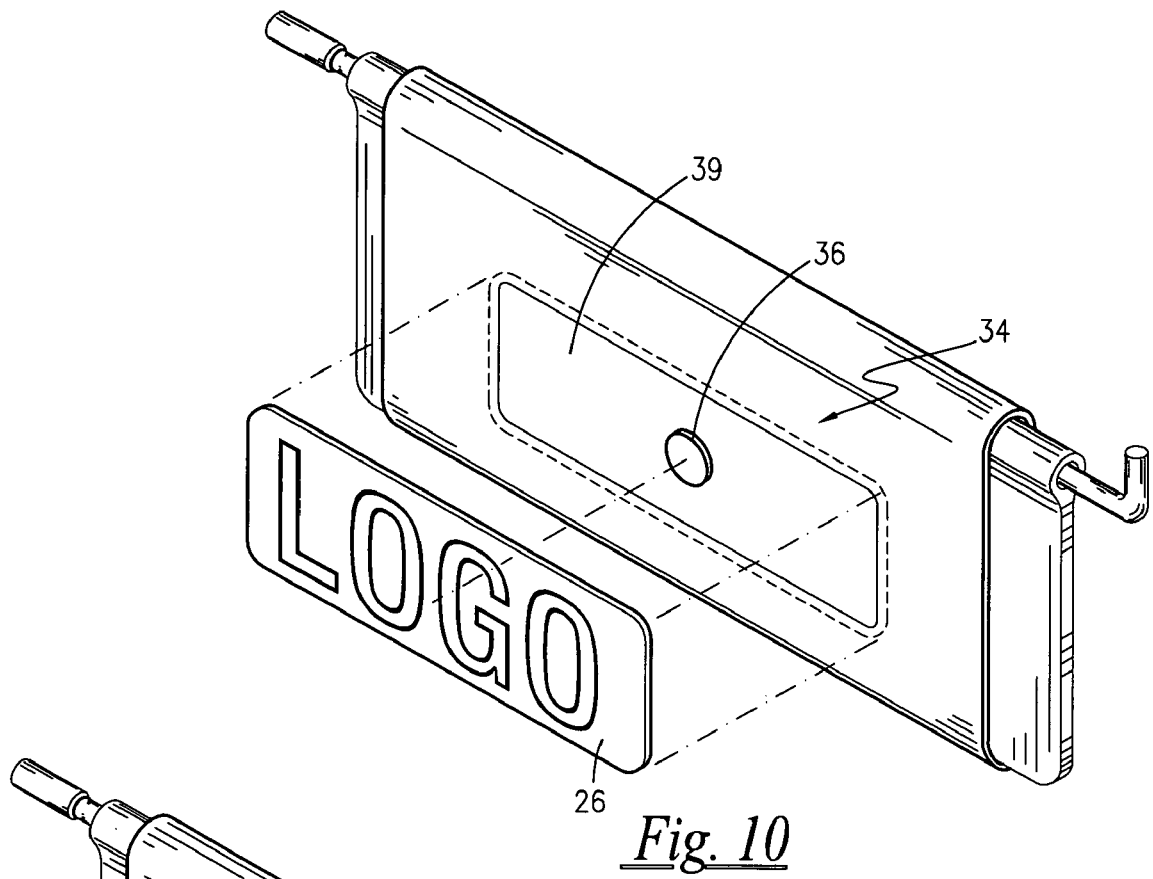
FIG. 10 is a perspective view of the cover with illumination means comprising a battery electrically and operatively coupled with a light panel, the battery and light panel cooperatively acting to illuminate the indicia provided on the cover.
Figure 11:
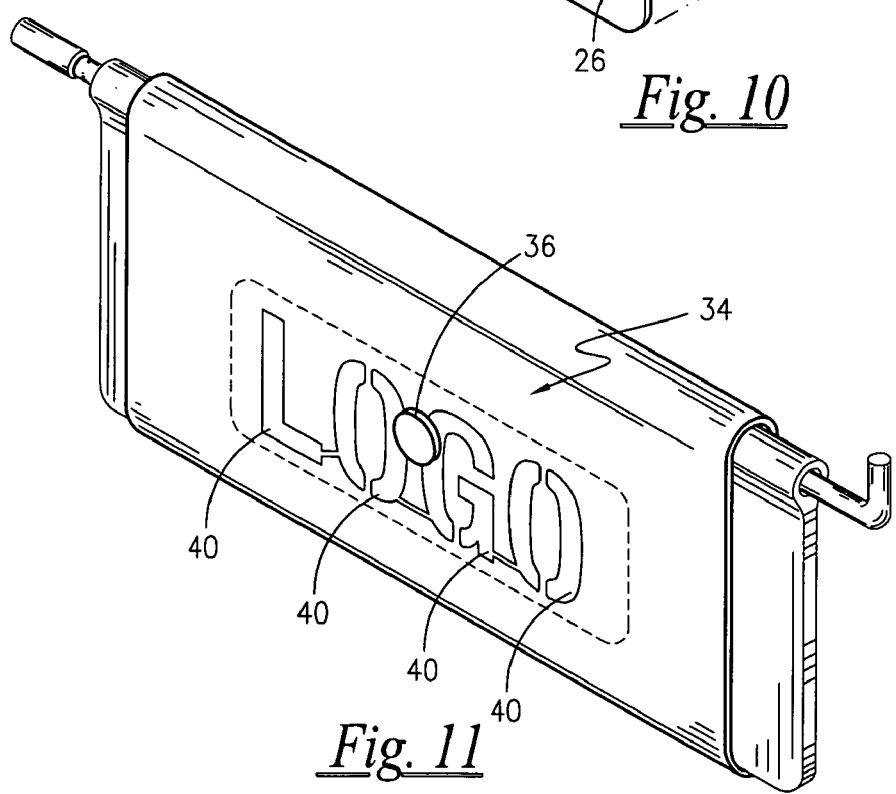
FIG. 11 is a perspective view of an alternate embodiment of FIG. 10, wherein illumination means comprises a battery electrically and operatively coupled with tube lighting, the battery and tube lighting cooperatively acting to illuminate the indicia provided on the cover.
Figure 12:
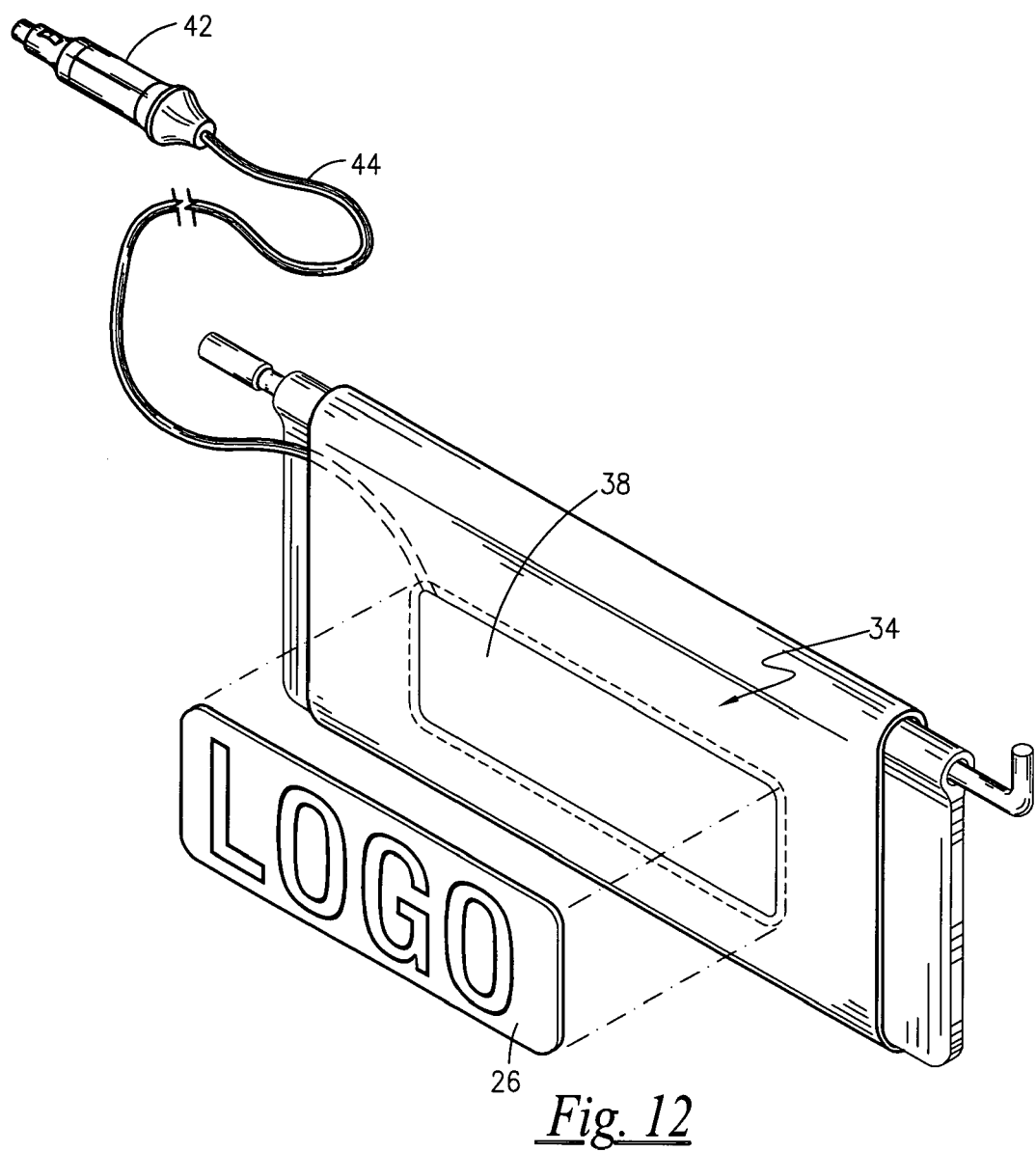
FIG. 12 is a perspective view of an alternate embodiment of FIG. 10.
Figure 13:
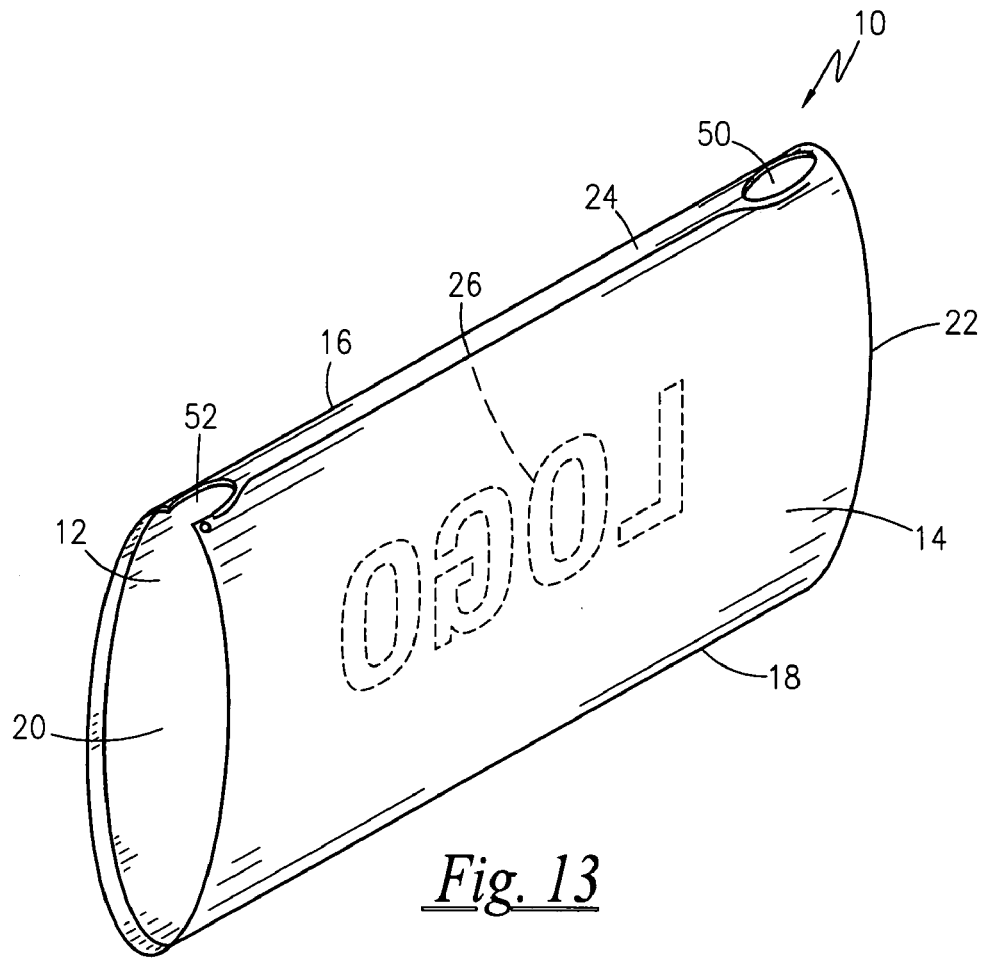
Figure 14:
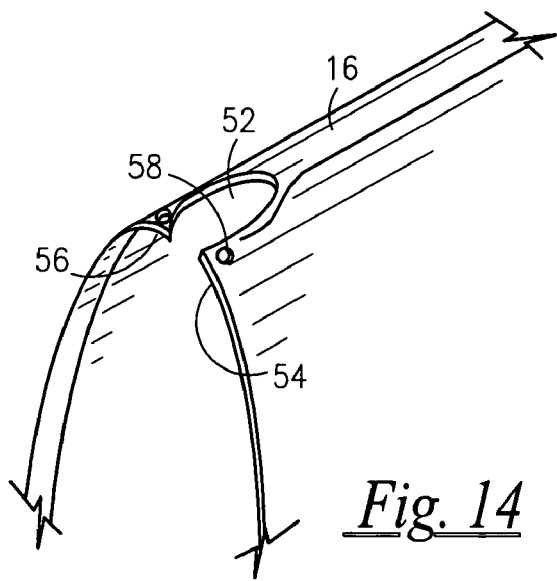
FIG. 14 is a perspective view of the opening in FIG. 13 corresponding to the post of the visor, wherein the opening is formed by the coupling of a segment of the front panel to a segment of the rear panel.
Figure 15:
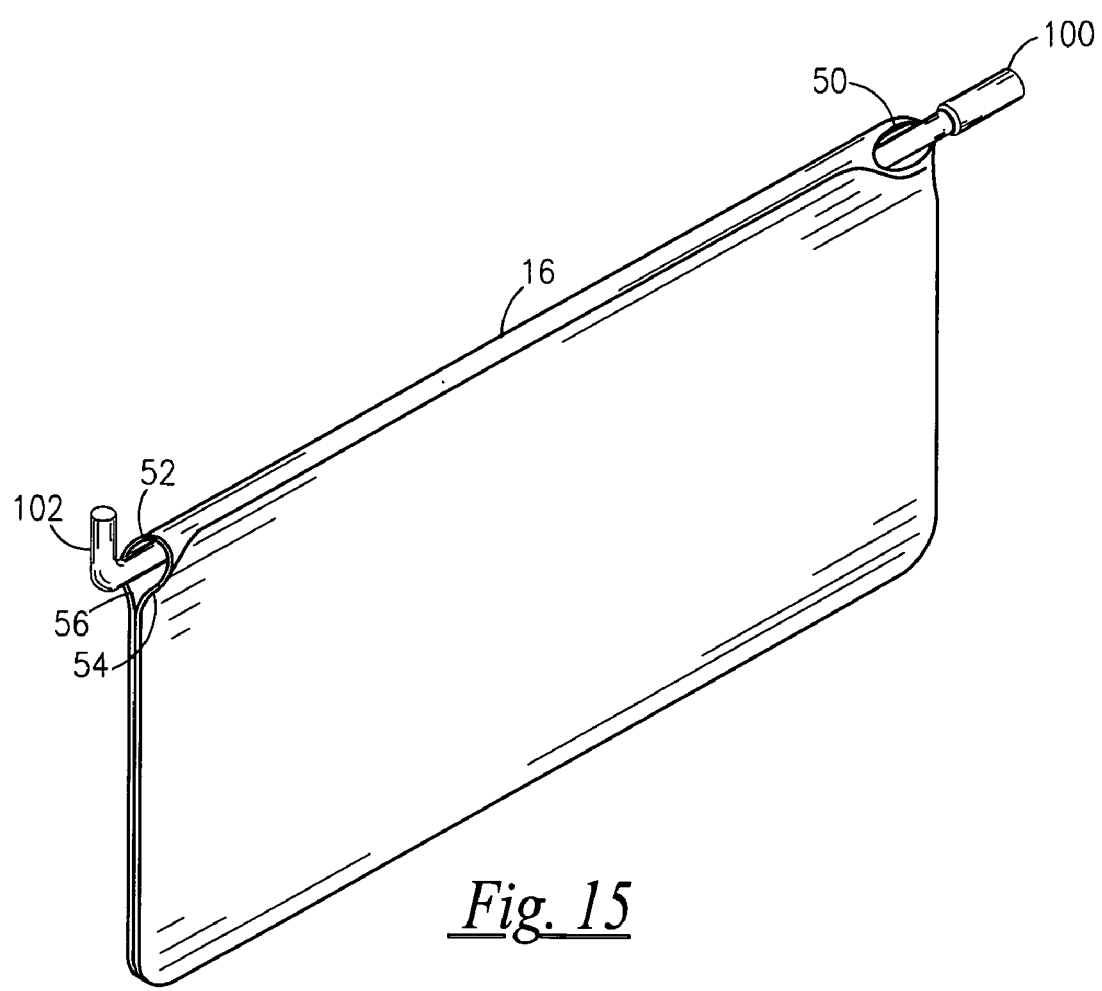
FIG. 15 is a perspective view of the embodiment in FIG. 13 positioned on a sun visor with the stem and post projecting through the openings depicted.

Referring now to FIG. 10 and FIG. 12, the indicia 26 that may be provided on the panels 12 or 14 of the cover 10 may include illumination means 34 of various types, included embedded batteries or electrical coupling to the vehicle battery. Illumination means 34 is positioned adjacently behind the indicia 26 (shown in an exploded perspective in this view) provided on the cover 10. Illumination means 34 comprises a power source (such as a battery or power plug) and a light source (such as a light panel, tubes or other lights). As depicted in FIG. 10, illumination means 34 comprises a battery 36 electrically and operatively coupled to a light panel 38. The light panel 38 is envisioned as traversing the length and height of the indicia 26 provided so that the light generated by the light panel 38 is transmitted through the indicia 26 and provides an illuminated effect. In FIG. 11, illumination means comprises a battery 36 electrically and operatively coupled to a series of tubes 40 (or tube lighting) that correspond to the indicia 26 provided on the cover 10. In FIG. 12, illumination means 34 comprises a light panel 38 electrically and operatively coupled with a 12 volt adapter plug 42 suitable for insertion into a 12 volt outlet in an automobile (such as a cigarette lighter). The plug 42 is operatively and electrically coupled to the light panel 38 via electrical wire 44. Although not shown, the plug 42 and wire 44 are envisioned as operative with the tubes 40 of FIG. 11 as well. In FIG. 10, FIG. 11 and FIG. 12, the indicia 26 may comprise a cut out of the indicia 26 (such as openings defining the "L", the "0", the "G" and the "0" of "LOGO" as shown). The indicia may also comprise openings with a clear and/or transparent guard (such as clear plastic) to protect the illumination means 34. The illumination may be a steady state or intermittent, with intermittent illumination having various pulsating rhythms commonly known in the art. Illumination of the indicia 26 may include a plurality of colors and/or coordination of colors. Providing illumination to the indicia 26 is a form of self expression that vehicle enthusiasts seek to accessorize vehicles.

Figure 16:
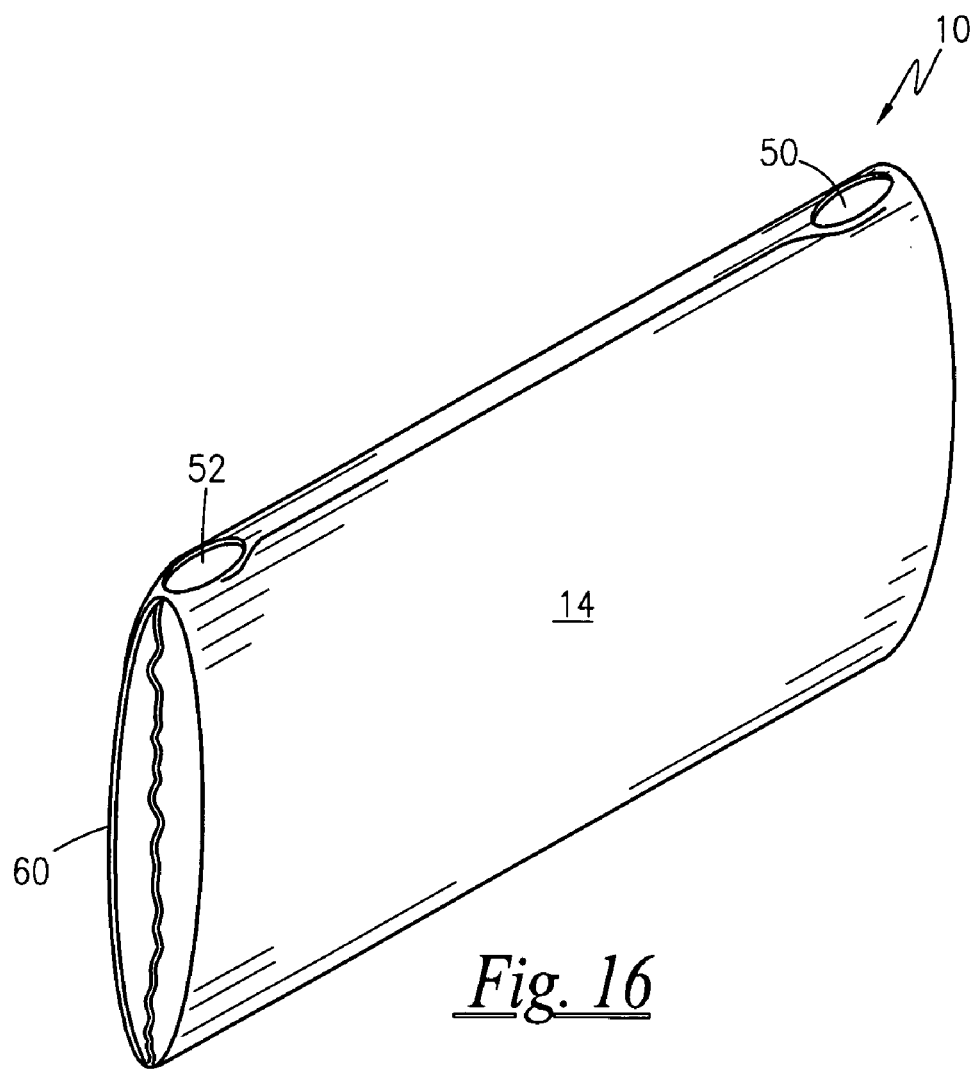
FIG. 16 is a perspective view of the embodiment in FIG. 13, wherein the end adjacent the opening depicted in FIG. 15 is coupled by closure means for sealing the end.

In another aspect of the present invention, as depicted in FIG. 13 through FIG. 16, the cover 10 as previously described, having a front panel 12 and a rear panel 14 coupled at a top margin 16 or a lower margin 18 by a seam 24, the front and rear panel 12 and 14 having a lateral width not greater than the lateral width of a sun visor on which the cover 10 is placed, the front panel 12 and the rear panel 14 manufactured from a returnably resilient material, and having indicia 26 affixed to the cover 10 along the front panel 12 so that when the sun visor is positioned for obstructing the sun, the indicia 26 is prominently visible to those outside the automobile, and having at least one aperture 20 formed by coupling of the front panel 12 and the rear panel 14 about the seam 24, the sun visor inserted into the at least one aperture 20, also includes a first opening 50 formed along the top margin 16 through which a stem 100 of the sun visor may project, and a second opening 52 also formed along the top margin 16 through which a post 102 of the sun visor may project, the second opening 52 formed by selective coupling of a segment 54 of the front panel 12 and a segment 56 of the rear panel 14 by a releasable closure 58. As depicted in FIG. 16, the aperture 20 formed at one end of the cover 10 is sealable via another releasable closure 60, so as to form a seal or margin along that end and envelope the cover 10 as desired. All embodiments are envisioned as having this ability, to seal one or both ends of the cover 10 as desired. The releasable closure 58 and closure 60 can be any of a number of ways to couple the segments, including hook and loop material, zippers, buttons, snaps and the like.

The cover 10 is envisioned as being manufactured from a returnably resilient material, such as LYCRA® or other similar material(s). The material must be a durable fabric capable of repeated installation and removal from a sun visor. The material must also be capable of withstanding repeated cycles of machine washing and/or drying for cleaning purposes, yet retain the resilience to conform to the sun visor and frictionally impinge thereon.

The present invention is envisioned as an aesthetic enhancement for an automobile sun visor having a returnably resilient fabric cover for enveloping the sun visor of an automobile, the cover having a width sufficient to obstruct a warning label affixed on the sun visor, and the cover having a mirror on a rear surface of the cover. The aesthetic enhancement may also have indicia affixed to a front surface of the cover such that when the sun visor is positioned for obstructing the sun, the indicia is prominently seen by those outside the automobile. The aesthetic enhancement may also have indicia affixed to the rear surface adjacent the mirror. The aesthetic enhancement may also have a pocket or pockets formed on the front surface, the rear surface of both surfaces, the pocket or pockets for inserting articles for temporary storage. The aesthetic enhancement may also have illumination means positioned adjacently posterior to the indicia. Illumination means provides illumination to the indicia. Illumination means comprising a power source electrically coupled to a light source.

2. Operation of the Preferred Embodiment

To use the present invention, a user will place a cover 10 about a sun visor "V" by inserting an end of the visor "V" through at least one aperture 20 formed in the cover 10 until the end abuts the margin 22. The indicia 26 may then be aligned with the desires of the user, with the intended alignment configured so that the indicia 26 faces outward from the automobile so that the indicia 26 may be viewed by on-coming traffic and or passers by. Obviously, the order of the positioning and alignment of the cover 10 may be reverse, wherein the indicia 26 is located and position so that when the cover 10 is placed onto the visor "V" the indicia 26 is already in the desired position.

The use of this invention is also in contemplation of a two-aperture apparatus, wherein a user will place a cover 10 about a sun visor "V" by inserting an end of the visor "V" through the first aperture 20 and then through the second aperture 28. Then, the indicia 26 is aligned as desired and noted above. Furthermore, and as in the first use described previously, the order of positioning and alignment of the indicia 26 may be reversed, so that the indicia 26 is appropriately positioned and then the cover 10 is slidably placed onto the visor "V".

It is further envisioned that the cover(s) 10 may be defined by a kit, wherein there is at least one cover 10 with identifying indicia 26 for placement on a visor "V". Another kit is also envisioned wherein the kit includes two covers 10 for placement on the two visors "V" that typically are found in automobiles.

The aforementioned detailed description is for the purpose of enabling those skilled in the art to practice the present invention. The description and disclosure are not intended to provide a limitation on the scope of the invention, and as such, the invention should only be limited by the following claims.

What is claimed is:

1. An aesthetic enhancement for an automobile sun visor having a returnably resilient fabric cover for enveloping the sun visor of an automobile, said cover further having indicia affixed to a front surface of said cover such that when the sun visor is positioned for obstructing the sun, the indicia is visible to those outside the automobile, said cover having a width sufficient to obstruct a warning label affixed on the sun visor, and said cover having a removable mirror on a rear surface of said cover, further comprising illumination means positioned adjacently posterior to said indicia for providing illumination to said indicia, said illumination means comprising a power source electrically coupled to a light source.

2. The aesthetic enhancement for an automobile sun visor of claim 1, wherein said cover has a closed end and an open end.

3. The aesthetic enhancement for an automobile sun visor of claim 2, wherein said open end is selectively releasable.

4. An aesthetic enhancement for an automobile sun visor having a returnably resilient fabric cover for enveloping the sun visor of an automobile, said cover further having indicia affixed to a front surface of said cover such that when the sun visor is positioned for obstructing the sun, the indicia is visible to those outside the automobile, said cover having a width sufficient to obstruct a warning label affixed on the sun visor, and said cover having a removable mirror on a rear surface of said cover, further comprising an opening formed along said top margin through which a stem of said sun visor may project, and an additional opening formed along said top margin through which a post of said sun visor may project, said additional opening formed by selective coupling of a front segment and a rear segment.

5. A cover for an automobile sun visor comprising:
   a front panel and a rear panel coupled at a top margin or a lower margin by a seam, said front panel and said rear panel manufactured from a returnably resilient material;
   indicia affixed to said cover along said front panel so that when the sun visor is positioned for obstructing the sun, said indicia is prominently visible to those outside the automobile;
   at least one aperture formed by coupling of said front panel and said rear panel about said seam;
   said lateral width of said panels are of a width sufficient to obstruct warning labels affixed or imprinted on said sun visor such that a user can slidably insert said sun visor through said aperture; and
   a mirror provided on said rear panel; further comprising an opening formed in said top margin to permit the stem of the visor to protrude therethrough.

6. The cover claim 5, further comprising a second aperture formed at a side opposite to a first aperture such that said first and second apertures permit a user to slidably arrange the cover on a sun visor, wherein said sun visor slidably passes through one aperture and then the remaining aperture so as to envelop the sun visor.

7. The cover of claim 5, wherein coupling about said seam is selected from the group consisting of fabric stitching, bonding adhesives, hook and loop fasteners, button snaps, buttons, and zippers.

8. The cover of claim 5, further comprising identifying indicia affixed to said cover along said rear panel.

9. The cover of claim 5, further comprising an integral pocket on said rear panel.

10. A cover for an automobile sun visor comprising:
   a front panel and a rear panel coupled at a top margin or a lower margin by a seam, said front panel and said rear panel manufactured from a returnably resilient material;
   indicia affixed to said cover along said front panel so that when the sun visor is positioned for obstructing the sun, said indicia is prominently visible to those outside the automobile;
   at least one aperture formed by coupling of said front panel and said rear panel about said seam;
   said lateral width of said panels are of a width sufficient to obstruct warning labels affixed or imprinted on said sun visor such that a user can slidably insert said sun visor through said aperture; and
   a mirror provided on said rear panel; further comprising illumination means placed adjacently posterior to said indicia for providing illumination to said indicia, said illumination means comprising a power source electrically coupled to a light source.

11. A cover for an automobile sun visor comprising:
a front panel and a rear panel coupled at a top margin or a lower margin by a seam, said front panel and said rear panel manufactured from a returnably resilient material;
indicia affixed to said cover along said front panel so that when the sun visor is positioned for obstructing the sun, said indicia is prominently visible to those outside the automobile;
at least one aperture formed by coupling of said front panel and said rear panel about said seam, said sun visor inserted into said at least one aperture;
a first opening formed along said top margin through which a stem of said sun visor may project; and
a second opening formed along said top margin through which a post of said sun visor may project, said second opening formed by selective coupling of a segment of said front panel and a segment of said rear panel by a releasable closure.

12. The cover of claim 11, wherein said at least one aperture is opposite to a vertical margin formed to enclose an opposing end of said cover.

13. The cover claim 11 further comprising a second aperture formed at a side opposite to a first aperture such that said first and second apertures permit a user to slidably arrange the cover on a sun visor, wherein said sun visor slidably passes through one aperture and then the remaining aperture so as to envelop the sun visor.

14. The cover of claim 11 further comprising an integral pocket on said rear panel.

15. The cover of claim 11 further comprising illumination means placed adjacently posterior to said indicia for providing illumination to said indicia, said illumination means comprising a power source electrically coupled to a light source.

* * * * *